(12) United States Patent
Tokuda

(10) Patent No.: US 11,480,485 B2
(45) Date of Patent: *Oct. 25, 2022

(54) PRESSURE MEASUREMENT DEVICE HAVING PIEZOSTRICTIVE AND MAGNETOSTRICTIVE MEASUREMENT UNITS

(71) Applicant: Azbil Corporation, Tokyo (JP)

(72) Inventor: Tomohisa Tokuda, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 47 days.

This patent is subject to a terminal disclaimer.

(21) Appl. No.: 17/158,201

(22) Filed: Jan. 26, 2021

(65) Prior Publication Data

US 2021/0239554 A1 Aug. 5, 2021

(30) Foreign Application Priority Data

Jan. 30, 2020 (JP) .............................. JP2020-013755

(51) Int. Cl.
*G01L 9/00* (2006.01)
(52) U.S. Cl.
CPC .......... *G01L 9/0042* (2013.01); *G01L 9/0052* (2013.01)
(58) Field of Classification Search
None
See application file for complete search history.

(56) References Cited

U.S. PATENT DOCUMENTS

| 9,534,972 B2* | 1/2017 | Eichhorn ............... G01L 9/0054 |
| 10,962,433 B2* | 3/2021 | Schanz .................. G01L 9/007 |
| 2010/0083765 A1 | 4/2010 | Yoneda et al. |
| 2018/0356308 A1 | 12/2018 | Okamoto et al. |

FOREIGN PATENT DOCUMENTS

| JP | 5-227729 B2 | 7/2013 | |
| JP | 2016-014581 A | 1/2016 | |
| WO | WO-2006002988 A1 * | 1/2006 | ............... G01L 1/12 |

* cited by examiner

*Primary Examiner* — Peter J Macchiarolo
*Assistant Examiner* — Jermaine L Jenkins (57) ABSTRACT

Measurement with satisfactory sensitivity in a low-pressure range, and accurate measurement in a wider pressure range, are realized by a pressure sensor that includes a diaphragm layer and a pressure receiving region formed on the diaphragm layer. The pressure sensor includes a first piezostrictive element, a second piezostrictive element, a third piezostrictive element, and a fourth piezostrictive element. In addition, the pressure sensor includes a first magnetostrictive element, a second magnetostrictive element, a third magnetostrictive element, and a fourth magnetostrictive element. A switching function unit outputs a pressure value calculated by a second calculation function unit until a pressure value calculated by a first calculation function unit exceeds a set threshold value, and outputs the pressure value calculated by the first calculation function unit when the pressure value calculated by the first calculation function unit exceeds the threshold value.

15 Claims, 3 Drawing Sheets

PRESSURE MEASUREMENT DEVICE HAVING PIEZOSTRICTIVE AND MAGNETOSTRICTIVE MEASUREMENT UNITS

CROSS REFERENCE TO RELATED APPLICATIONS

This patent application claims the benefit of foreign priority to Japanese Patent Application No. JP 2020-013755 filed on Jan. 30, 2020, the disclosure of which is hereby incorporated by reference in its entirety.

BACKGROUND OF THE INVENTION

The present disclosure relates to a pressure measurement device.

For example, in petroleum, petrochemical, and chemical plants, a pressure measurement device using a piezoresistance-type pressure sensor is used to measure a flow rate, a pressure, a liquid level, or specific gravity of a process fluid (PTL 1). The piezoresistance-type pressure sensor is excellent in response linearity, but has low sensitivity in a low-pressure region. In this type of the pressure sensor, in order to improve the sensitivity, a countermeasure is to provide a thinner diaphragm. However, when the diaphragm is thinner, problems arise in that a body pressure is lowered and an upper limit value of a measurable pressure is lowered.

On the other hand, a strain detection element having a gauge factor 50 times or greater that of the piezoresistance type has been proposed (PTL 2). The element includes a detection magnetic layer and a reference magnetic layer whose magnetization is changed due to a strain, and has a magnetic tunnel junction structure in which the detection magnetic layer and the reference magnetic layer are subjected to tunnel junction via a barrier layer (magnetic tunnel junction element).

CITATION LIST

Patent Literature

[PTL 1] Japanese Patent No. 5227729
[PTL 2] JP-A-2016-014581

BRIEF SUMMARY OF THE INVENTION

However, while the pressure sensor using the magnetic tunnel junction element has high sensitivity in a range having a small pressure value, it has degraded response linearity at a pressure outside its own detection range, thereby causing a problem in that the pressure cannot be accurately measured.

The present disclosure is made to solve the above-described problem, and an object thereof is to enable measurement with satisfactory sensitivity in a low-pressure range and to enable accurate measurement in a wider pressure range.

According to an aspect of the present disclosure, there is provided a pressure measurement device including a pressure sensor, and a pressure calculation unit. The pressure sensor includes a diaphragm layer, a pressure receiving region formed in the diaphragm layer, a piezostrictive measurement unit provided in the diaphragm layer in an outer peripheral portion of the pressure receiving region, and formed of a piezostrictive element that measures a strain of the pressure receiving region by using a piezoresistive effect, and a magnetostrictive measurement unit provided in the pressure receiving region of the diaphragm layer, formed of a magnetostrictive element that is formed of a material whose magnetization is changed due to the strain, and that measures the strain of the pressure receiving region. The pressure calculation unit includes a first calculation function unit configured to calculate a pressure value received by the pressure receiving region, based on a measurement result of the piezostrictive measurement unit, a second calculation function unit configured to calculate a pressure value received by the pressure receiving region, based on a measurement result of the magnetostrictive measurement unit, and a switching function unit configured to output the pressure value calculated by the second calculation function unit until the pressure value calculated by the first calculation function unit exceeds a set threshold value, and to output the pressure value calculated by the first calculation function unit when the pressure value calculated by the first calculation function unit exceeds the threshold value.

In the pressure measurement device, the piezostrictive measurement unit and the magnetostrictive measurement unit may be disposed at positions where generated stress peaks in the pressure receiving region.

In one configuration example of the pressure measurement device, the piezostrictive measurement unit may be disposed at a location where a piezoelectric effect is generated in the pressure receiving region.

In one configuration example of the pressure measurement device, the piezostrictive measurement unit may be formed of a first piezostrictive element, a second piezostrictive element, a third piezostrictive element, and a fourth piezostrictive element which form a first bridge circuit. The magnetostrictive measurement unit may be formed of a first magnetostrictive element, a second magnetostrictive element, a third magnetostrictive element, and a fourth magnetostrictive element which form a second bridge circuit. The magnetostrictive measurement unit may be disposed at a location different from that of the piezostrictive measurement unit.

In one configuration example of the pressure measurement device, the pressure receiving region may have a circular shape in a plan view.

In one configuration example of the pressure measurement device, the pressure receiving region may have a square shape in a plan view.

As described above, according to the present disclosure, the piezostrictive measurement unit and the magnetostrictive measurement unit are provided in the pressure receiving region of the diaphragm layer. Therefore, the present disclosure enables accurate measurement in a wider pressure range.

DETAILED DESCRIPTION OF THE INVENTION

Hereinafter, a pressure measurement device according to embodiments of the present disclosure will be described.

Embodiment 1

Figure 1A:
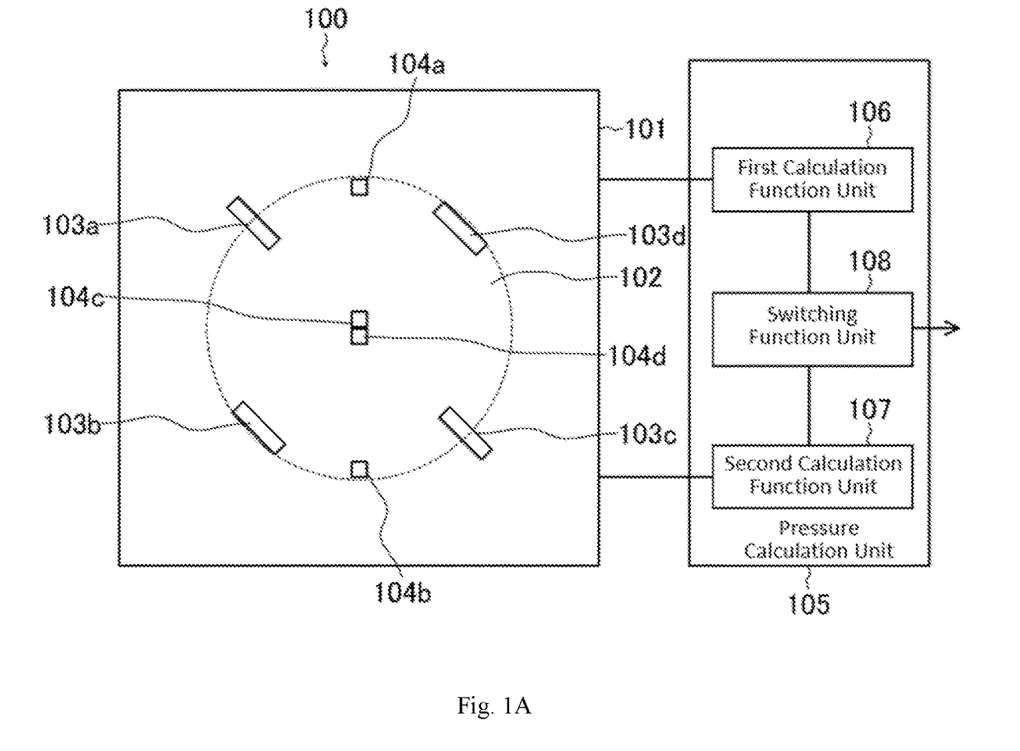
FIG. 1A is a plan view illustrating a configuration of a pressure measurement device according to Embodiment 1 of the present disclosure.
Figure 1B:
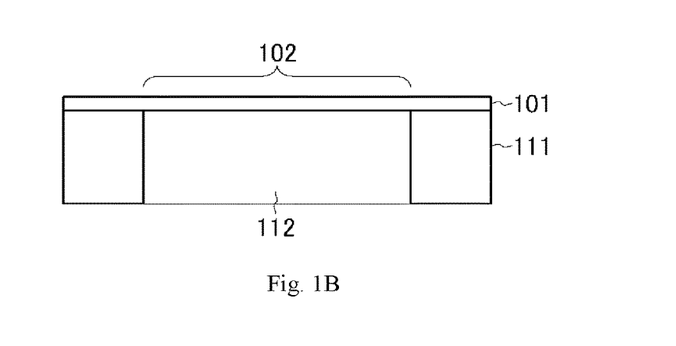
FIG. 1B is a sectional view illustrating a configuration of the pressure measurement device according to Embodiment 1 of the present disclosure.

First, a pressure measurement device according to Embodiment 1 of the present disclosure will be described with reference to FIGS. 1A and 1B.

The pressure measurement device includes a pressure sensor 100 and a pressure calculation unit 105. The pressure sensor 100 includes a diaphragm layer 101 and a pressure receiving region 102 formed in the diaphragm layer 101. For example, the pressure receiving region 102 has a circular shape in a plan view. The pressure receiving region 102 is a partial region of the diaphragm layer 101, and for example, the pressure receiving region 102 can be deflected (deformed) in a normal direction of a plane of the diaphragm layer 101. The pressure receiving region 102 may have a polygonal shape such as a square shape in a plan view. For example, the diaphragm layer 101 is formed on a base 111. The base 111 has a through-hole 112 that penetrates the base 111 in a thickness direction. For example, the base 111 can be formed of single-crystal silicon. In this case, the pressure receiving region 102 is a partial region of the diaphragm layer 101 which is defined by a space of the through-hole 112.

In addition, the pressure sensor 100 includes a first piezostrictive element 103a, a second piezostrictive element 103b, a third piezostrictive element 103c, and a fourth piezostrictive element 103d in the diaphragm layer 101 in an outer peripheral portion of the pressure receiving region 102. Each of the first piezostrictive element 103a, the second piezostrictive element 103b, the third piezostrictive element 103c, and the fourth piezostrictive element 103d serves as a piezostrictive measurement unit that measures a strain of the pressure receiving region 102 by using a piezoresistive effect. The piezostrictive element can be disposed at a position where generated stress peaks in the pressure receiving region 102. In addition, the piezostrictive element is disposed at a location where the piezoelectric effect is generated in the pressure receiving region 102.

For example, the diaphragm layer 101 is formed of single-crystal silicon whose main surface has a plane orientation (100). In addition, the piezostrictive element can be formed of a piezoresistance region including a p-type region into which boron (B) serving as a p-type impurity is introduced, at a predetermined location of the diaphragm layer 101 formed of the single-crystal silicon.

In this example, four of the first piezostrictive element 103a, the second piezostrictive element 103b, the third piezostrictive element 103c, and the fourth piezostrictive element 103d are disposed at an equal interval in a circumferential direction of the pressure receiving region 102. In addition, a first straight line connecting the first piezostrictive element 103a and the third piezostrictive element 103c and a second straight line connecting the second piezostrictive element 103b and the fourth piezostrictive element 103d are orthogonal to each other. The first straight line and the second straight line extend in a crystalline orientation 110 of the single-crystal silicon whose main surface forming the diaphragm layer 101 has a plane orientation (100).

In a plan view, the first piezostrictive element 103a and the third piezostrictive element 103c are formed in a rectangular shape in which a longitudinal direction extends in the crystalline orientation 110 of the single-crystal silicon, and measure a strain generated by deflection of the pressure receiving region 102. In this example, in a plan view, the first piezostrictive element 103a and the third piezostrictive element 103c are formed in a rectangular shape in which each axis in the longitudinal direction is parallel to a straight line extending in a radial direction from a center of the pressure receiving region 102.

On the other hand, in a plan view, the second piezostrictive element 103b and the fourth piezostrictive element 103d are formed in a rectangular shape in which the longitudinal direction extends in the crystalline orientation 110 of the single-crystal silicon, and measure the strain generated by the deflection of the pressure receiving region 102. In this example, in a plan view, the second piezostrictive element 103b and the fourth piezostrictive element 103d are formed in a rectangular shape in which each axis in the longitudinal direction is perpendicular to the straight line extending in the radial direction from the center of the pressure receiving region 102.

According to the above-described configuration, when the pressure receiving region 102 is deflected, the first piezostrictive element 103a and the third piezostrictive element 103c, and the second piezostrictive element 103b and the fourth piezostrictive element 103d, are in a state where signs of respective resistance values are different from each other.

In addition, the pressure sensor 100 includes a first magnetostrictive element 104a, a second magnetostrictive element 104b, a third magnetostrictive element 104c, and a fourth magnetostrictive element 104d in the pressure receiving region 102 of the diaphragm layer 101. The first magnetostrictive element 104a, the second magnetostrictive element 104b, the third magnetostrictive element 104c, and the fourth magnetostrictive element 104d are formed of a material whose magnetization is changed due to the strain, and serve as a magnetostrictive measurement unit that measures the strain of the pressure receiving region 102. The magnetostrictive element can be disposed at a position where the generated stress peaks in the pressure receiving region 102.

In each of the first magnetostrictive element 104a, the second magnetostrictive element 104b, the third magnetostrictive element 104c, and the fourth magnetostrictive element 104d, the magnetostrictive element includes a detection magnetic layer whose magnetization is changed due to the strain and a reference magnetic layer serving as a reference for the detection magnetic layer. The detection magnetic layer and the reference magnetic layer are subjected to tunnel junction via a barrier layer, and measure the strain of the pressure receiving region 102 by using a resistance change between the detection magnetic layer and the reference magnetic layer. For example, the reference magnetic layer is a layer having fixed magnetization, and the magnetization is not changed due to the strain.

For example, the detection magnetic layer, the barrier layer, and the reference magnetic layer of each magnetostrictive element are disposed on the diaphragm layer 101 in a state of being stacked in a thickness direction of the diaphragm layer 101. In this case, the first magnetostrictive element 104a and the second magnetostrictive element 104b are disposed at locations where a tensile strain is generated due to the deflection of the pressure receiving region 102. For example, the first magnetostrictive element 104a and the second magnetostrictive element 104b are disposed in the diaphragm layer 101 on an outer peripheral portion of the pressure receiving region 102. High sensitivity can be obtained by disposing the elements at the location where the tensile strain is most generated (position where the tensile strain peaks).

On the other hand, the third magnetostrictive element 104c and the fourth magnetostrictive element 104d are disposed at locations where a compression strain is generated due to the deflection of the pressure receiving region 102. For example, the third magnetostrictive element 104c and the fourth magnetostrictive element 104d are disposed in a central portion of the pressure receiving region 102. The third magnetostrictive element 104c and the fourth magnetostrictive element 104d can also be disposed at locations where the strain is not generated (outside the pressure receiving region 102).

In addition, the first magnetostrictive element 104a, the second magnetostrictive element 104b, the third magnetostrictive element 104c, and the fourth magnetostrictive element 104d are disposed at locations different from those of the first piezostrictive element 103a, the second piezostrictive element 103b, the third piezostrictive element 103c, and the fourth piezostrictive element 103d. For example, an angle formed between a third straight line connecting the first magnetostrictive element 104a and the third magnetostrictive element 104c and the first straight line can be set to 45°.

In the above-described pressure measurement device, first, the first piezostrictive element 103a, the second piezostrictive element 103b, the third piezostrictive element 103c, and the fourth piezostrictive element 103d form a first bridge circuit using the elements as resistance elements. When stress is generated in the pressure receiving region 102 in a state where a constant current flows, the first bridge circuit outputs a change in the resistance value of each piezostrictive element (piezoresistance region) which is caused by the generated stress, as a voltage change. Each node of the first bridge circuit is connected to an electrode (not illustrated) via a wiring pattern formed on a surface of a region (not illustrated) of the diaphragm layer 101.

In addition, in the pressure measurement device, the first magnetostrictive element 104a, the second magnetostrictive element 104b, the third magnetostrictive element 104c, and the fourth magnetostrictive element 104d form a second bridge circuit using the elements as resistance elements. When the stress is generated in the pressure receiving region 102 in a state where an external magnetic field is applied to the first magnetostrictive element 104a, the second magnetostrictive element 104b, the third magnetostrictive element 104c, and the fourth magnetostrictive element 104d, the second bridge circuit outputs a change in the resistance value of each magnetic tunnel junction element which is caused by the generated stress, as a voltage change.

In the magnetostrictive element, a detection magnetic layer whose magnetization is changed due to the strain, a non-magnetic layer formed of a non-magnetic material, and a reference magnetic layer serving as a reference for the detection magnetic layer are stacked in this order. The magnetostrictive element can measure the strain of the pressure receiving region 102 by using a resistance change in a direction parallel to a plane of the non-magnetic layer. In this case, as in the configuration of the piezostrictive element, four of the first magnetostrictive element, the second magnetostrictive element, the third magnetostrictive element, and the fourth magnetostrictive element can be used. In addition, in this case, the shape of the first magnetostrictive element and the third magnetostrictive element in a plan view can be a rectangular shape in which each axis in the longitudinal direction is parallel to the straight line extending in the radial direction from the center of the pressure receiving region 102. The shape of the second magnetostrictive element and the fourth magnetostrictive element in a plan view can be a rectangular shape in which each axis in the longitudinal direction is perpendicular to the straight line extending in the radial direction from the center of the pressure receiving region 102.

The pressure calculation unit 105 includes a first calculation function unit 106, a second calculation function unit 107, and a switching function unit 108. The first calculation function unit 106 calculates a pressure value received by the pressure receiving region 102, based on a measurement result of the above-described piezostrictive measurement unit. The second calculation function unit 107 calculates a pressure value received by the pressure receiving region 102, based on a measurement result of the magnetostrictive measurement unit.

The switching function unit 108 outputs the pressure value calculated by the second calculation function unit 107 until the pressure value calculated by the first calculation function unit 106 exceeds a set threshold value, and outputs the pressure value calculated by the first calculation function unit 106 when the pressure value calculated by the first calculation function unit 106 exceeds the threshold value. The threshold value is determined, based on a range in which the magnetostrictive measurement unit (magnetostrictive element) has response linearity.

According to the pressure measurement device of Embodiment 1 described above, in a range where the pressure value calculated by the piezostrictive measurement unit is smaller than the set threshold value, the pressure value calculated by the magnetostrictive measurement unit is selected (output). In a range where the pressure value calculated by the piezostrictive measurement unit is greater than the set threshold value, the pressure value calculated by the piezostrictive measurement unit is selected (output). Accordingly, the pressure can be measured with satisfactory sensitivity in a low-pressure range, and can be accurately measured in a wider pressure range.

Embodiment 2

Figure 2A:
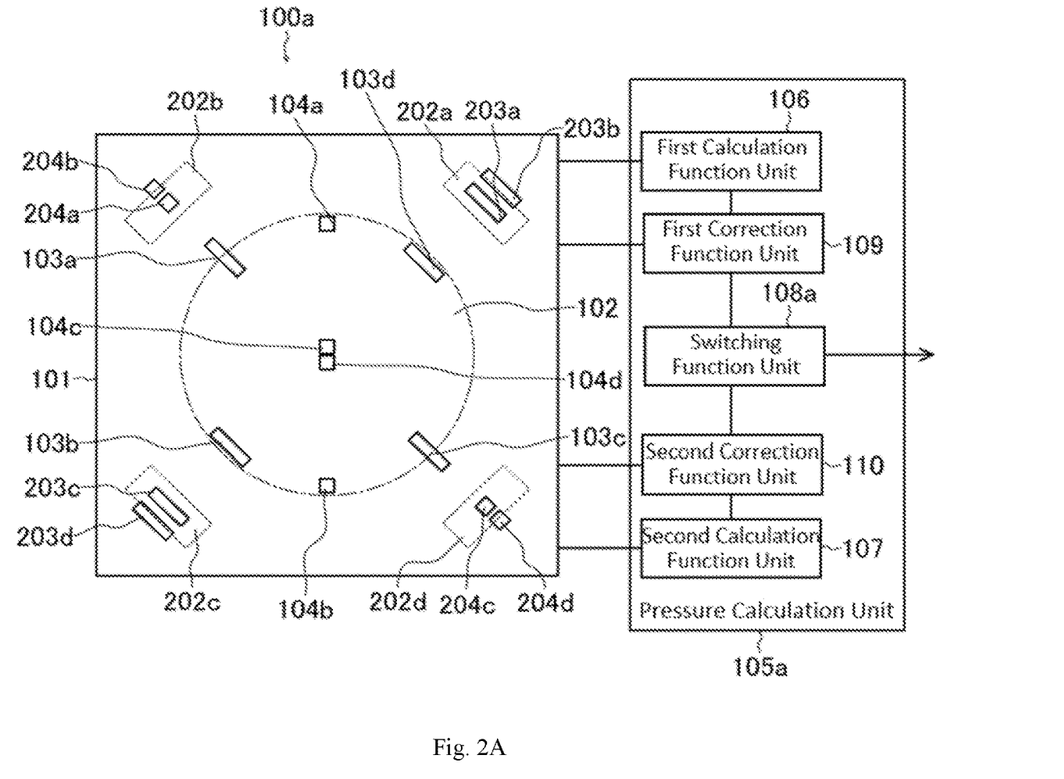
FIG. 2A is a plan view illustrating a configuration of a pressure measurement device according to Embodiment 2 of the present disclosure.
Figure 2B:
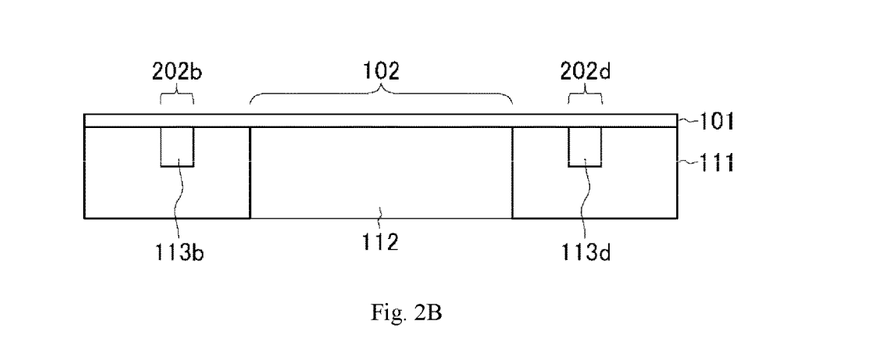
FIG. 2B is a sectional view illustrating a configuration of the pressure measurement device according to Embodiment 2 of the present disclosure.

Next, a pressure measurement device according to Embodiment 2 of the present disclosure will be described with reference to FIGS. 2A and 2B.

The pressure measurement device includes a pressure sensor 100a and a pressure calculation unit 105a. The pressure sensor 100a includes the diaphragm layer 101 and the pressure receiving region 102 formed in the diaphragm layer 101. In addition, the pressure sensor 100a includes the first piezostrictive element 103a, the second piezostrictive element 103b, the third piezostrictive element 103c, and the fourth piezostrictive element 103d. In addition, the pressure measurement device includes the first magnetostrictive element 104a, the second magnetostrictive element 104b, the third magnetostrictive element 104c, and the fourth magnetostrictive element 104d. The configurations are the same as those in Embodiment 1 described above.

In addition, in the pressure sensor 100a, a first auxiliary pressure receiving region 202a, a second auxiliary pressure receiving region 202b, a third auxiliary pressure receiving region 202c, and a fourth auxiliary pressure receiving region 202d are formed around the pressure receiving region 102 of the diaphragm layer 101. For example, as illustrated in FIG. 2B, the second auxiliary pressure receiving region 202b and the fourth auxiliary pressure receiving region 202d are partial regions of the diaphragm layer 101 which are defined by a cavity 113b and a cavity 113d which are formed in the base 111. The same applies to the first auxiliary pressure receiving region 202a and the third auxiliary pressure receiving region 202c. FIG. 2B illustrates a cross section taken along a line passing through the central portion of the pressure receiving region 102c in FIG. 2A. Each of the first auxiliary pressure receiving region 202a, the second auxiliary pressure receiving region 202b, the third auxiliary pressure receiving region 202c, and the fourth auxiliary pressure receiving region 202d has a rectangular shape having different lengths of adjacent sides in a plan view.

In addition, in the pressure sensor 100a, a first auxiliary piezostrictive element 203a and a second auxiliary piezostrictive element 203b are provided in the first auxiliary pressure receiving region 202a. In addition, a first auxiliary magnetostrictive element 204a and a second auxiliary magnetostrictive element 204b are provided in the second auxiliary pressure receiving region 202b. In addition, a third auxiliary piezostrictive element 203c and a fourth auxiliary piezostrictive element 203d are provided in the third auxiliary pressure receiving region 202c. In addition, a third auxiliary magnetostrictive element 204c and a fourth auxiliary magnetostrictive element 204d are provided in the fourth auxiliary pressure receiving region 202d.

The first auxiliary piezostrictive element 203a, the second auxiliary piezostrictive element 203b, the third auxiliary piezostrictive element 203c, and the fourth auxiliary piezostrictive element 203d are the same as the first piezostrictive element 103a, the second piezostrictive element 103b, the third piezostrictive element 103c, and the fourth piezostrictive element 103d, and are elements including the piezoresistance region.

The first auxiliary magnetostrictive element 204a, the second auxiliary magnetostrictive element 204b, the third auxiliary magnetostrictive element 204c, and the fourth auxiliary magnetostrictive element 204d are the same as the first magnetostrictive element 104a, the second magnetostrictive element 104b, the third magnetostrictive element 104c, and the fourth magnetostrictive element 104d.

In Embodiment 2, a differential pressure measurement unit is configured to include the pressure receiving region 102. A first static pressure measurement unit is configured to include the first auxiliary pressure receiving region 202a and the third auxiliary pressure receiving region 202c. A second static pressure measurement unit is configured to include the second auxiliary pressure receiving region 202b and the fourth auxiliary pressure receiving region 202d (refer to PTL 1).

Here, each of the first auxiliary piezostrictive element 203a, the first auxiliary magnetostrictive element 204a, the third auxiliary piezostrictive element 203c, and the third auxiliary magnetostrictive element 204c is disposed in the center of each of the first auxiliary pressure receiving region 202a, the second auxiliary pressure receiving region 202b, the third auxiliary pressure receiving region 202c, and the fourth auxiliary pressure receiving region 202d, respectively. In addition, the first auxiliary piezostrictive element 203a and the third auxiliary piezostrictive element 203c are provided along the longitudinal direction of the first auxiliary pressure receiving region 202a and the third auxiliary pressure receiving region 202c having a rectangular shape in a plan view, respectively.

In addition, each of the second auxiliary piezostrictive element 203b, the second auxiliary magnetostrictive element 204b, the fourth auxiliary piezostrictive element 203d, and the fourth auxiliary magnetostrictive element 204d is disposed on an edge of each of the first auxiliary pressure receiving region 202a, the second auxiliary pressure receiving region 202b, the third auxiliary pressure receiving region 202c, and the fourth auxiliary pressure receiving region 202d. In addition, the second auxiliary piezostrictive element 203b and the fourth auxiliary piezostrictive element 203d are provided along the longitudinal direction of the first auxiliary pressure receiving region 202a and the third auxiliary pressure receiving region 202c having a rectangular shape in a plan view, respectively.

In addition, the pressure calculation unit 105a includes the first calculation function unit 106, the second calculation function unit 107, a switching function unit 108a, a first correction function unit 109, and a second correction function unit 110. The first calculation function unit 106 and the second calculation function unit 107 are the same as those in Embodiment 1 described above.

The first correction function unit 109 corrects a pressure value calculated by the first calculation function unit 106, based on a measurement result of the first static pressure measurement unit configured to include the first auxiliary pressure receiving region 202a and the third auxiliary pressure receiving region 202c. In addition, the second correction function unit 110 corrects a pressure value calculated by the second calculation function unit 107, based on a measurement result of the second static pressure measurement unit configured to include the second auxiliary pressure receiving region 202b and the fourth auxiliary pressure receiving region 202d.

In addition, in Embodiment 2, the switching function unit 108a first outputs a pressure value corrected by the second correction function unit 110 until a pressure value corrected by the first correction function unit 109 exceeds a set threshold value. On the other hand, when the pressure value corrected by the first correction function unit 109 exceeds the threshold value, the switching function unit 108a outputs the pressure value corrected by the first correction function unit 109.

According to Embodiment 2 described above, the stress generated in the static pressure measurement unit can be efficiently measured. As a result, measurement sensitivity of a static pressure can be improved. In addition, according to Embodiment 2, the pressure value calculated by the calculation unit is corrected by the static pressure correction function unit. Accordingly, it is possible to prevent a problem called a crosstalk in which a zero point of an output is shifted due to the static pressure affecting the differential pressure and the pressure.

In Embodiment 2 described above, the pressure is measured by the magnetostrictive measurement unit in a range having a small pressure value, and the pressure is measured by the piezostrictive measurement unit in a range having a great pressure value. Therefore, the pressure can be measured with satisfactory sensitivity in a low-pressure range, and can be accurately measured in a wider pressure range.

Incidentally, the pressure receiving region can have a square shape in a plan view. A pressure sensor 100b using a pressure receiving region 102a formed in a square shape in a plan view will be described with reference to FIG. 3.

Figure 3:
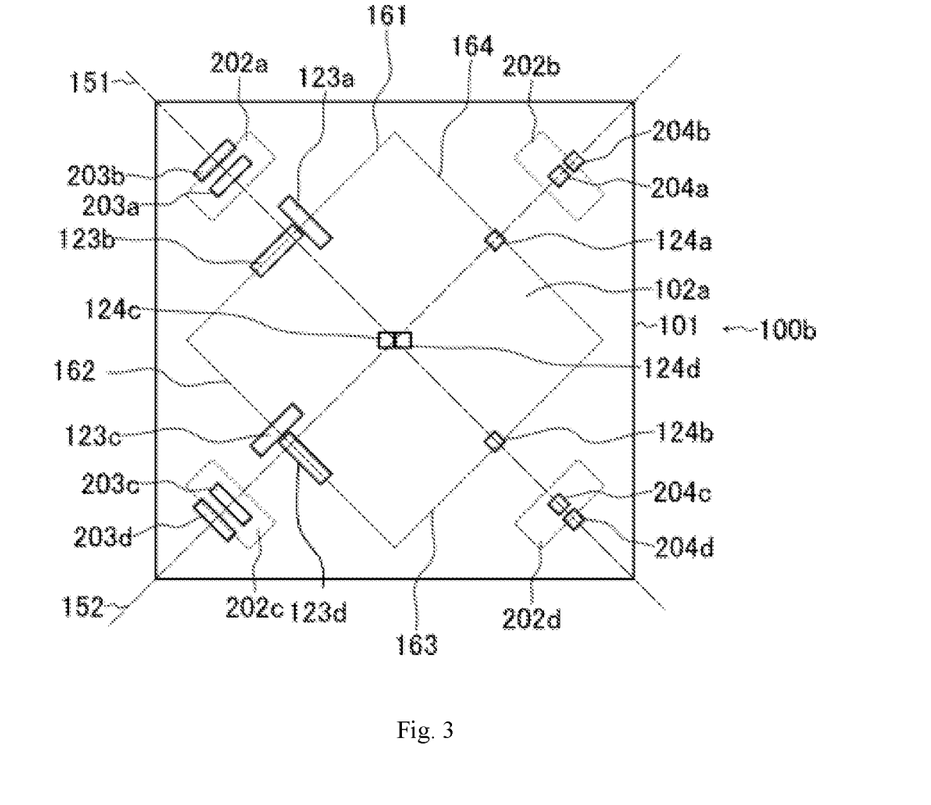
FIG. 3 is a plan view illustrating a partial configuration of another pressure measurement device according to Embodiment 3 of the present disclosure.

The pressure sensor 100b includes the diaphragm layer 101 and the pressure receiving region 102a formed in the diaphragm layer 101. The pressure receiving region 102a has a square shape in a plan view. Each side of the square shape extends in the crystalline orientation 110 of the single-crystal silicon whose main surface forming the diaphragm layer 101 has a plane orientation (100).

In addition, the pressure sensor 100b includes a first piezostrictive element 123a, a second piezostrictive element 123b, a third piezostrictive element 123c, and a fourth piezostrictive element 123d. A set of the first piezostrictive element 123a and the second piezostrictive element 123b is disposed in a central portion of a first side 161 of the pressure receiving region 102a having a square shape in a plan view. In addition, a set of the third piezostrictive element 123c and the fourth piezostrictive element 123d is disposed in a central portion of a second side 162 of the pressure receiving region 102a having a square shape in a plan view. The second side 162 is a side adjacent to the first side 161.

In addition, as in the above-described configuration, the pressure sensor 100b includes a first magnetostrictive element 124a, a second magnetostrictive element 124b, a third magnetostrictive element 124c, and a fourth magnetostrictive element 124d. The first magnetostrictive element 124a is disposed in a central portion of a fourth side 164 of the pressure receiving region 102a having a square shape in a plan view. In addition, the second magnetostrictive element 124b is disposed in a central portion of a third side 163 of the pressure receiving region 102a having a square shape in a plan view. The third side 163 is a side adjacent to the second side 162 and the fourth side 164 and facing the first side 161. The fourth side 164 is a side adjacent to the first side 161 and the third side 163 and facing the second side 162.

In addition, as in the above-described configuration, the first auxiliary pressure receiving region 202a, the second auxiliary pressure receiving region 202b, the third auxiliary pressure receiving region 202c, and the fourth auxiliary pressure receiving region 202d are formed around the pressure receiving region 102a of the diaphragm layer 101.

The first auxiliary pressure receiving region 202a and the fourth auxiliary pressure receiving region 202d are disposed on a first straight line 151 passing through a midpoint of the first side 161 and a midpoint of the third side 163. In addition, the second auxiliary pressure receiving region 202b and the third auxiliary pressure receiving region 202c are disposed on a second straight line 152 passing through a midpoint of the second side 162 and a midpoint of the fourth side 164.

A set of the first piezostrictive element 123a and the second piezostrictive element 123b is disposed on the first straight line 151. In other words, the first auxiliary pressure receiving region 202a is disposed on an extension line in which a set of the first piezostrictive element 123a and the second piezostrictive element 123b is disposed when viewed from a center of the pressure receiving region 102a. In addition, the second magnetostrictive element 124b is disposed on the first straight line 151. In other words, the fourth auxiliary pressure receiving region 202d is disposed on an extension line in which the second magnetostrictive element 124b is disposed when viewed from the center of the pressure receiving region 102a.

The first magnetostrictive element 124a is disposed on the second straight line 152. In other words, the second auxiliary pressure receiving region 202b is disposed on an extension line in which the first magnetostrictive element 124a is disposed when viewed from the center of the pressure receiving region 102a. In addition, a set of the third piezostrictive element 123c and the fourth piezostrictive element 123d is disposed on the second straight line 152. In other words, the third auxiliary pressure receiving region 202c is disposed on an extension line in which a set of the third piezostrictive element 123c and the fourth piezostrictive element 123d is disposed when viewed from the center of the pressure receiving region 102a.

In addition, as in the above-described configuration, the first auxiliary piezostrictive element 203a and the second auxiliary piezostrictive element 203b are provided in the first auxiliary pressure receiving region 202a. In addition, the first auxiliary magnetostrictive element 204a and the second auxiliary magnetostrictive element 204b are provided in the second auxiliary pressure receiving region 202b. In addition, the third auxiliary piezostrictive element 203c and the fourth auxiliary piezostrictive element 203d are provided in the third auxiliary pressure receiving region 202c. In addition, the third auxiliary magnetostrictive element 204c and the fourth auxiliary magnetostrictive element 204d are provided in the fourth auxiliary pressure receiving region 202d.

The first auxiliary piezostrictive element 203a, the second auxiliary piezostrictive element 203b, the third auxiliary piezostrictive element 203c, and the fourth auxiliary piezostrictive element 203d are the same as the first piezostrictive element 123a, the second piezostrictive element 123b, the third piezostrictive element 123c, and the fourth piezostrictive element 123d, and are elements including the piezoresistance region.

The first auxiliary magnetostrictive element 204a, the second auxiliary magnetostrictive element 204b, the third auxiliary magnetostrictive element 204c, and the fourth auxiliary magnetostrictive element 204d are the same as the first magnetostrictive element 124a, the second magnetostrictive element 124b, the third magnetostrictive element 124c, and the fourth magnetostrictive element 124d.

As in the above-described configuration, the differential pressure measurement unit is configured to include the pressure receiving region 102a, and the static pressure measurement unit is configured to include the first auxiliary pressure receiving region 202a, the second auxiliary pressure receiving region 202b, the third auxiliary pressure receiving region 202c, and the fourth auxiliary pressure receiving region 202d (refer to PTL 1).

Here, each of the first auxiliary piezostrictive element 203a, the first auxiliary magnetostrictive element 204a, the third auxiliary piezostrictive element 203c, and the third auxiliary magnetostrictive element 204c is disposed in the center of each of the first auxiliary pressure receiving region 202a, the second auxiliary pressure receiving region 202b, the third auxiliary pressure receiving region 202c, and the fourth auxiliary pressure receiving region 202d. In addition, the first auxiliary piezostrictive element 203a and the third auxiliary piezostrictive element 203c are provided along the longitudinal direction of the auxiliary pressure receiving region having a rectangular shape in a plan view.

In addition, each of the second auxiliary piezostrictive element 203b, the second auxiliary magnetostrictive element 204b, the fourth auxiliary piezostrictive element 203d, and the fourth auxiliary magnetostrictive element 204d is disposed on an edge of each of the first auxiliary pressure receiving region 202a, the second auxiliary pressure receiving region 202b, the third auxiliary pressure receiving region 202c, and the fourth auxiliary pressure receiving region 202d. In addition, the second auxiliary piezostrictive element 203b and the fourth auxiliary piezostrictive element 203d are provided along the longitudinal direction of the auxiliary pressure receiving region having a rectangular shape in a plan view.

The pressure sensor 100b can also efficiently measure the stress generated in the static pressure measurement unit. As a result, measurement sensitivity of a static pressure can be improved.

Figure 4:
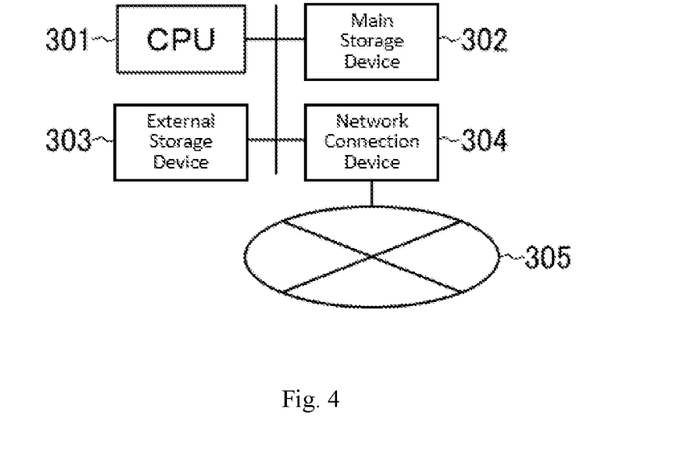
FIG. 4 is a configuration diagram illustrating a hardware configuration of the pressure measurement device according to the embodiment of the present disclosure.

As illustrated in FIG. 4, the pressure calculation unit of the pressure measurement device according to the above-described embodiment functions as a computer device including a central processing unit (CPU) 301, a main storage device 302, an external storage device 303, and a network connection device 304. A program deployed in the main storage device 302 operates the CPU 301 (program is executed). In this manner, each of the above-described functions can also be realized. The above-described program is a program for causing the computer to execute the functions of the pressure calculation unit in the above-described embodiment. The network connection device 304 is connected to a network 305. In addition, each of the functions can be distributed to a plurality of computer devices.

In addition, the above-described pressure calculation unit can also be configured to include a programmable logic device (PLD) such as a field-programmable gate array (FPGA). For example, as circuits, a logic element of the FPGA is provided with the storage unit, the first calculation function unit, the second calculation function unit, the switching function unit, the first correction function unit, and the second correction function unit. In this manner, the logic element can function as the pressure calculation unit. Each of the storage circuit, the first calculation circuit, the second calculation circuit, the switching circuit, the first correction circuit, and the second correction circuit can be written on the FPGA by connecting a predetermined writing device. In addition, each of the above-described circuits written on the FPGA can be confirmed by the writing device connected to the FPGA.

As described above, according to the present disclosure, the piezostrictive measurement unit and the magnetostrictive measurement unit are provided in the pressure receiving region of the diaphragm layer. Therefore, the pressure can be accurately measured in a wider pressure range.

The present disclosure is not limited to the embodiments described above, and it is obvious that various modifications and combinations can be made by a person having ordinary knowledge in the field within the technical idea of the present disclosure.

DESCRIPTION OF REFERENCE NUMERALS AND SIGNS

100: pressure sensor, 101: diaphragm layer, 102: pressure receiving region, 103a: first piezostrictive element, 103b: second piezostrictive element, 103c: third piezostrictive element, 103d: fourth piezostrictive element, 104a: first magnetostrictive element, 104b: second magnetostrictive element, 104c: third magnetostrictive element, 104d: fourth magnetostrictive element, 105: pressure calculation unit, 106: first calculation function unit, 107: second calculation function unit, 108: switching function unit, 111: base, 112: through-hole

The invention claimed is:

1. A pressure measurement device comprising:
a pressure sensor; and
a pressure calculation unit;
wherein the pressure sensor includes
   a diaphragm layer,
   a pressure receiving region formed in the diaphragm layer,
   a piezostrictive measurement unit provided in the diaphragm layer in an outer peripheral portion of the pressure receiving region, and formed of a piezostrictive element that measures a strain of the pressure receiving region by using a piezoresistive effect, and
   a magnetostrictive measurement unit provided in the pressure receiving region of the diaphragm layer, and formed of a magnetostrictive element that is formed of a material whose magnetization is changed due to the strain, and that measures the strain of the pressure receiving region, and
the pressure calculation unit includes
   a first calculation function unit configured to calculate a pressure value received by the pressure receiving region, based on a measurement result of the piezostrictive measurement unit,
   a second calculation function unit configured to calculate a pressure value received by the pressure receiving region, based on a measurement result of the magnetostrictive measurement unit, and
   a switching function unit configured to output the pressure value calculated by the second calculation function unit until the pressure value calculated by the first calculation function unit exceeds a set threshold value, and to output the pressure value calculated by the first calculation function unit when the pressure value calculated by the first calculation function unit exceeds the threshold value.

2. The pressure measurement device according to claim 1, wherein the piezostrictive measurement unit and the magnetostrictive measurement unit are disposed at positions where generated stress peaks in the pressure receiving region.

3. The pressure measurement device according to claim 2, wherein the pressure receiving region has a circular shape in a plan view.

4. The pressure measurement device according to claim 2, wherein the pressure receiving region has a square shape in a plan view.

5. The pressure measurement device according to claim 1, wherein the piezostrictive measurement unit is disposed at a location where a piezoelectric effect is generated in the pressure receiving region.

6. The pressure measurement device according to claim 5, wherein
the piezostrictive measurement unit is formed of a first piezostrictive element, a second piezostrictive element, a third piezostrictive element, and a fourth piezostrictive element which form a first bridge circuit,
the magnetostrictive measurement unit is formed of a first magnetostrictive element, a second magnetostrictive element, a third magnetostrictive element, and a fourth magnetostrictive element which form a second bridge circuit, and
the magnetostrictive measurement unit is disposed at a location different from that of the piezostrictive measurement unit.

7. The pressure measurement device according to claim 6, wherein the pressure receiving region has a circular shape in a plan view.

8. The pressure measurement device according to claim 6, wherein the pressure receiving region has a square shape in a plan view.

9. The pressure measurement device according to claim 5, wherein the pressure receiving region has a circular shape in a plan view.

10. The pressure measurement device according to claim 5, wherein the pressure receiving region has a square shape in a plan view.

11. The pressure measurement device according to claim 1, wherein
the piezostrictive measurement unit is formed of a first piezostrictive element, a second piezostrictive element, a third piezostrictive element, and a fourth piezostrictive element which form a first bridge circuit,
the magnetostrictive measurement unit is formed of a first magnetostrictive element, a second magnetostrictive element, a third magnetostrictive element, and a fourth magnetostrictive element which form a second bridge circuit, and
the magnetostrictive measurement unit is disposed at a location different from that of the piezostrictive measurement unit.

12. The pressure measurement device according to claim 11, wherein the pressure receiving region has a circular shape in a plan view.

13. The pressure measurement device according to claim 11, wherein the pressure receiving region has a square shape in a plan view.

14. The pressure measurement device according to claim 1, wherein the pressure receiving region has a circular shape in a plan view.

15. The pressure measurement device according to claim 1, wherein the pressure receiving region has a square shape in a plan view.

* * * * *